United States Patent
Gilmour et al.

(10) Patent No.: US 10,262,691 B1
(45) Date of Patent: Apr. 16, 2019

(54) SYSTEMS AND METHODS FOR GENERATING TIME LAPSE VIDEOS

(71) Applicant: GoPro, Inc., San Mateo, CA (US)

(72) Inventors: Nicholas Ryan Gilmour, San Jose, CA (US); Jessica Bonner, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/717,408

(22) Filed: Sep. 27, 2017

(51) Int. Cl.
*G11B 27/00* (2006.01)
*G11B 27/031* (2006.01)
*H04N 5/232* (2006.01)
*H04N 5/915* (2006.01)
*G06K 9/00* (2006.01)
*G06T 7/246* (2017.01)

(52) U.S. Cl.
CPC ........ *G11B 27/005* (2013.01); *G06K 9/00744* (2013.01); *G06T 7/246* (2017.01); *G11B 27/031* (2013.01); *H04N 5/23216* (2013.01); *H04N 5/23238* (2013.01); *H04N 5/915* (2013.01); *G06T 2207/10016* (2013.01); *H04N 5/23254* (2013.01); *H04N 5/23267* (2013.01)

(58) Field of Classification Search
CPC .. G11B 27/34; G11B 27/034; H04N 5/23238; H04N 5/23254; H04N 5/23267
USPC .......................................................... 386/282
See application file for complete search history.

(56) References Cited

U.S. PATENT DOCUMENTS

2018/0115706 A1* 4/2018 Kang ................ H04N 5/23238

* cited by examiner

*Primary Examiner* — Thai Q Tran
*Assistant Examiner* — Syed Y Hasan
(74) *Attorney, Agent, or Firm* — Esplin & Associates, PC

(57) ABSTRACT

Video information may define spherical video content having a duration. Spherical video content may define visual content viewable from a point of view as a function of progress through the spherical video content. Path information may define a path selection for the spherical video content. Path selection may include movement of a viewing window within the spherical video content. The viewing window may define extents of the visual content viewable from the point of view as the function of progress through the spherical video content. Time lapse parameter information may define at least two of a time portion of the duration, an image sampling rate, and a time lapse speed effect. A time lapse video may be generated based on the video information, the path information, and the time lapse parameter information.

20 Claims, 8 Drawing Sheets

SYSTEMS AND METHODS FOR GENERATING TIME LAPSE VIDEOS

FIELD

This disclosure relates to generating time lapse videos using spherical video content, path selection of the spherical video content, and time lapse parameters.

BACKGROUND

A video may include greater visual capture of one or more scenes/objects/activities than may be viewed at a time (e.g., over-capture). A lengthy video may be difficult to view at once.

SUMMARY

This disclosure relates to generating time lapse videos. Video information, path information, time lapse parameter information, and/or other information may be obtained. The video information may define spherical video content having a duration. The spherical video content may define visual content viewable from a point of view as a function of progress through the spherical video content. The path information may define a path selection for the spherical video content. The path selection may include movement of a viewing window within the spherical video content. The viewing window may define extents of the visual content viewable from the point of view as the function of progress through the spherical video content. The time lapse parameter information may define at least two of (1) a time portion of the duration to be included in a time lapse video, (2) an image sampling rate defining video frame selection for the time lapse video, and (3) a time lapse speed effect defining a perceived speed with which the time lapse video is presented during playback. Time lapse video information defining the time lapse video may be generated based on the video information, the path information, the time lapse parameter information, and/or other information. The time lapse video may include at least a portion of the visual content of the spherical video content within the viewing window during the time portion of the duration. The time lapse video information may be stored in one or more storage media.

A system that generates time lapse videos may include one or more of display, electronic storage, processor, and/or other components. The display may be configured to present video content and/or other information. In some implementations, the display may include a touchscreen display. The touchscreen display may be configured to generate touchscreen output signals indicating locations on the touchscreen display of user engagement with the touchscreen display.

The electronic storage may store video information defining video content, and/or other information. Video content may refer to media content that may be consumed as one or more videos. Video content may include one or more videos stored in one or more formats/containers, and/or other video content. Video content may have a progress length. The video content may define visual content viewable as a function of progress through the video content. The video content may include one or more of spherical video content, virtual reality content, and/or other video content. Spherical video content and virtual reality content may define visual content viewable from a point of view as a function of progress through the spherical video content/virtual reality content.

The processor(s) may be configured by machine-readable instructions. Executing the machine-readable instructions may cause the processor(s) to facilitate generating time lapse videos. The machine-readable instructions may include one or more computer program components. The computer program components may include one or more of an video information component, a path information component, a time lapse parameter component, a time lapse video component, a storage component, and/or other computer program components.

The video information component may be configured to obtain video information defining one or more video content (e.g., spherical video content) and/or other information. The video information component may obtain video information from one or more storage locations. The video information component may be configured to obtain video information during acquisition of the video content and/or after acquisition of the video content by one or more image sensors.

The path information component may be configured to obtain path information defining one or more path selections for the video content (e.g., spherical video content), and/or other information. The path selection may include movement of a viewing window within the video content. The viewing window may define extents of the visual content viewable as the function of progress through the video content. For spherical video content, the viewing window may define extents of the visual content viewable from the point of view as the function of progress through the spherical video content. The viewing window may be characterized by a viewing direction, a viewing size, and/or other information. The path information may define a path selection based on changes in the viewing direction of the viewing window and/or other information. In some implementations, the path information may further define the viewing size of the viewing window.

In some implementations, the path selection(s) may be determined based on one or more user-defined paths through the video content and/or other information. In some implementations, the user-defined path(s) may be created based on user engagement with a touchscreen display and/or other information. In some implementations, the path selection(s) may be determined based on a user selection of one or more preset path shapes and/or other information. In some implementations, the path selection(s) may be determined based on detecting one or more objects within the video content and/or other information. In some implementations, the object(s) may be centered within the viewing window. In some implementations, the path selection(s) may be determined based on moving between points of interest captured within the video content and/or other information. In some implementations, the path selection(s) may be determined based on one or more rotations of the video content about one or more axes and/or other information.

The time lapse parameter component may be configured to obtain time lapse parameter information and/or other information. The time lapse parameter information may define at least two of (1) a time portion of the duration of the video content to be included in the time lapse video, (2) an image sampling rate defining video frame selection for the time lapse video, (3) a time lapse speed effect defining a perceived speed with which the time lapse video is presented during playback, and/or other information. In some implementations, the time lapse speed effect may be determined based on a duration of the time lapse video.

The time lapse video component may be configured to generate time lapse video information and/or other information. The time lapse video information may define a time lapse video based on the video information, the path information, the time lapse parameter information, and/or other information. The time lapse video may including at least a portion of the visual content of the video content within the viewing window during the time portion of the duration.

The storage component may be configured to effectuate storage of the time lapse video information and/or other information in one or more storage media. The storage component may effectuate storage of the time lapse video information in one or more storage locations including the video information and/or other storage locations.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
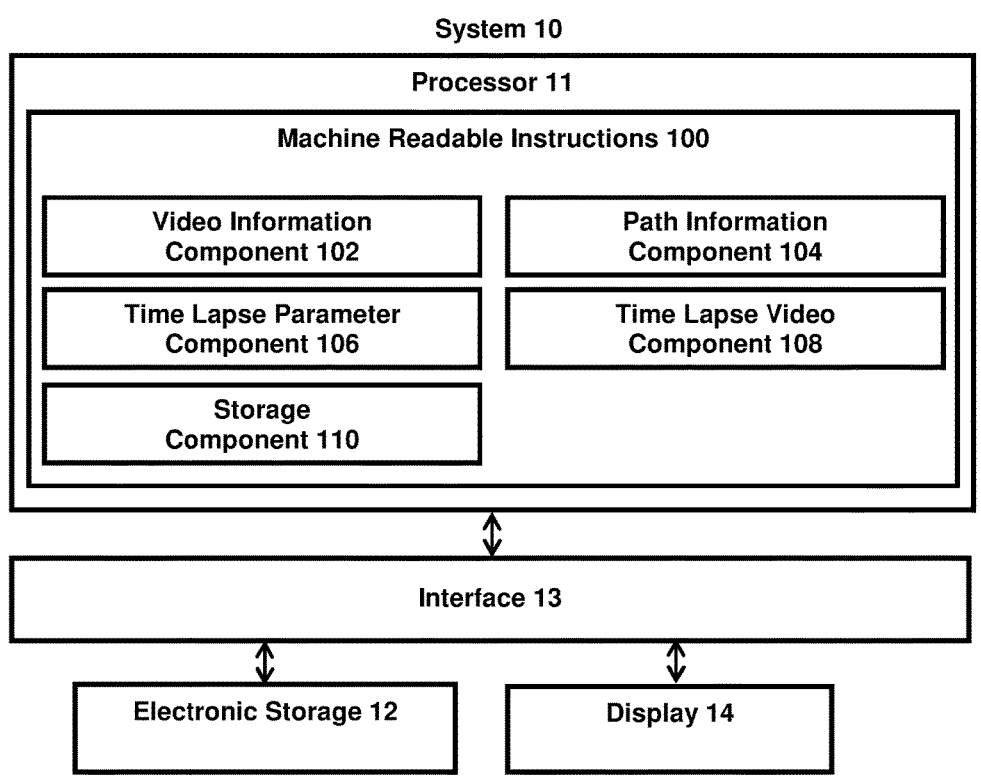
FIG. 1 illustrates a system that generates time lapse videos.

FIG. 1 illustrates a system 10 for generating time lapse videos. The system 10 may include one or more of a processor 11, an electronic storage 12, an interface 13 (e.g., bus, wireless interface), a display 14, and/or other components. Video information, path information, time lapse parameter information, and/or other information may be obtained by the processor 11. The video information may define spherical video content having a duration. The spherical video content may define visual content viewable from a point of view as a function of progress through the spherical video content. The path information may define a path selection for the spherical video content. The path selection may include movement of a viewing window within the spherical video content. The viewing window may define extents of the visual content viewable from the point of view as the function of progress through the spherical video content. The time lapse parameter information may define at least two of (1) a time portion of the duration to be included in a time lapse video, (2) an image sampling rate defining video frame selection for the time lapse video, and (3) a time lapse speed effect defining a perceived speed with which the time lapse video is presented during playback. Time lapse video information defining the time lapse video may be generated by the processor 11 based on the video information, the path information, the time lapse parameter information, and/or other information. The time lapse video may include at least a portion of the visual content of the spherical video content within the viewing window during the time portion of the duration. The time lapse video information may be stored in one or more storage media.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to video information, video content, path information, path selection, viewing window, time lapse parameter information, time lapse video information, time lapse video, and/or other information.

For example, the electronic storage 12 may store video information defining one or more video content and/or other information. Video content may refer to media content that may be consumed as one or more videos. Video content may include one or more videos stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Video content may define visual content viewable as a function of progress through the video content. In some implementations, video content may include one or more of spherical video content, virtual reality content, and/or other video content. Spherical video content and/or virtual reality content may define visual content viewable from a point of view as a function of progress through the spherical/virtual reality video content.

Spherical video content may refer to a video capture of multiple views from a location. Spherical video content may include a full spherical video capture (360 degrees of capture, including opposite poles) or a partial spherical video capture (less than 360 degrees of capture). Spherical video content may be captured through the use of one or more cameras/image sensors to capture images/videos from a location. For example, multiple images/videos captured by multiple image sensors may be stitched together to form the spherical video content. The field of view of image sensor(s) may be moved/rotated (e.g., via movement/rotation of optical element(s), such as lens, of the image sensor(s)) to capture multiple images/videos from a location, which may be stitched together to form the spherical video content. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

The display 14 may be configured to present video content and/or other information. In some implementations, the display 14 may include a touchscreen display configured to receive user input via user engagement with the touchscreen display. For example, the display 14 may include a touchscreen display of a mobile device (e.g., camera, smartphone, tablet, laptop). The touchscreen display may be configured to generate touchscreen output signals indicating a location on the touchscreen display of user engagement with the touchscreen display.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate generating time lapse videos. The machine readable instructions 100 may include one or more computer program components. The machine readable instructions 100 may include one or more of a video information component 102, a path information component 104, a time lapse parameter component 106, a time lapse video component 108, a storage component 110, and/or other computer program components.

The video information component 102 may be configured to obtain video information defining one or more video content (e.g., spherical video content) and/or other information. Obtaining video information may include one or more of accessing, acquiring, analyzing, determining, examining, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 12, electronic storage of information and/or signals generated by one or more image sensors (not shown in FIG. 1), electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining one or more video content (e.g., spherical video content) during acquisition of the video content and/or after acquisition of the video content by one or more image sensors. For example, the video information component 102 may obtain video information defining a video while the video is being captured by one or more image sensors. The video information component 102 may obtain video information defining a video after the video has been captured and stored in memory (e.g., the electronic storage 12).

Figure 3:
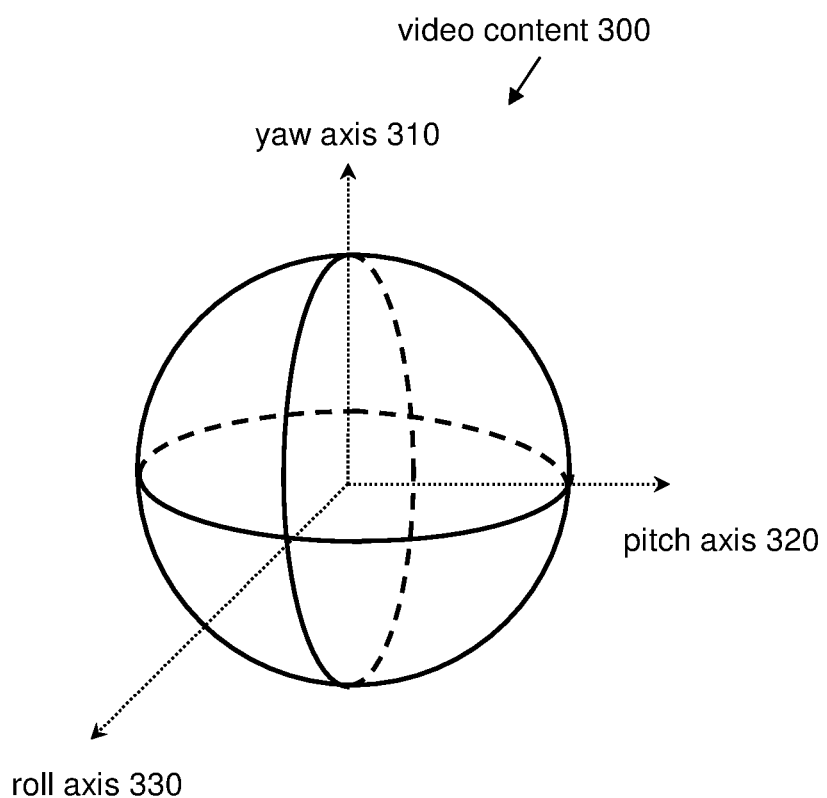
FIG. 3 illustrates an example spherical video content.

FIG. 3 illustrates an example video content 300 defined by video information. The video content 300 may include spherical video content. In some implementations, spherical video content may be stored with a 5.2K resolution. Using a 5.2K spherical video content may enable viewing windows for the spherical video content with resolution close to 1080p. In some implementations, spherical video content may include 12-bit video frames. FIG. 3 illustrates example rotational axes for the video content 300. Rotational axes for the video content 300 may include a yaw axis 310, a pitch axis 320, a roll axis 330, and/or other axes. Rotations about one or more of the yaw axis 310, the pitch axis 320, the roll axis 330, and/or other axes may define viewing directions/viewing window for the video content 300.

For example, a 0-degree rotation of the video content 300 around the yaw axis 310 may correspond to a front viewing direction. A 90-degree rotation of the video content 300 around the yaw axis 310 may correspond to a right viewing direction. A 180-degree rotation of the video content 300 around the yaw axis 310 may correspond to a back viewing direction. A −90-degree rotation of the video content 300 around the yaw axis 310 may correspond to a left viewing direction.

A 0-degree rotation of the video content 300 around the pitch axis 320 may correspond to a viewing direction that is level with respect to horizon. A 45-degree rotation of the video content 300 around the pitch axis 320 may correspond to a viewing direction that is pitched up with respect to horizon by 45-degrees. A 90 degree rotation of the video content 300 around the pitch axis 320 may correspond to a viewing direction that is pitched up with respect to horizon by 90-degrees (looking up). A −45-degree rotation of the video content 300 around the pitch axis 320 may correspond to a viewing direction that is pitched down with respect to horizon by 45-degrees. A −90 degree rotation of the video content 300 around the pitch axis 320 may correspond to a viewing direction that is pitched down with respect to horizon by 90-degrees (looking down).

A 0-degree rotation of the video content 300 around the roll axis 330 may correspond to a viewing direction that is upright. A 90 degree rotation of the video content 300 around the roll axis 330 may correspond to a viewing direction that is rotated to the right by 90 degrees. A −90-degree rotation of the video content 300 around the roll axis 330 may correspond to a viewing direction that is rotated to the left by 90-degrees. Other rotations and viewing directions are contemplated.

The path information component 104 may be configured to obtain path information defining one or more path selections for the video content (e.g., spherical video content), and/or other information. The path selection may include movement of a viewing window within the video content. The viewing window may define extents of the visual content viewable as the function of progress through the video content. For spherical video content, the viewing window may define extents of the visual content viewable from the point of view as the function of progress through the spherical video content.

The viewing window may be characterized by a viewing direction, a viewing size (e.g., zoom), and/or other information. A viewing direction may define a direction of view for video content. For example, for spherical video content, a viewing direction may define a direction of view from the point of view from which the visual content is defined. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window is directed to a forward portion of the visual content captured within the spherical video content).

Figures 4A, 4B:
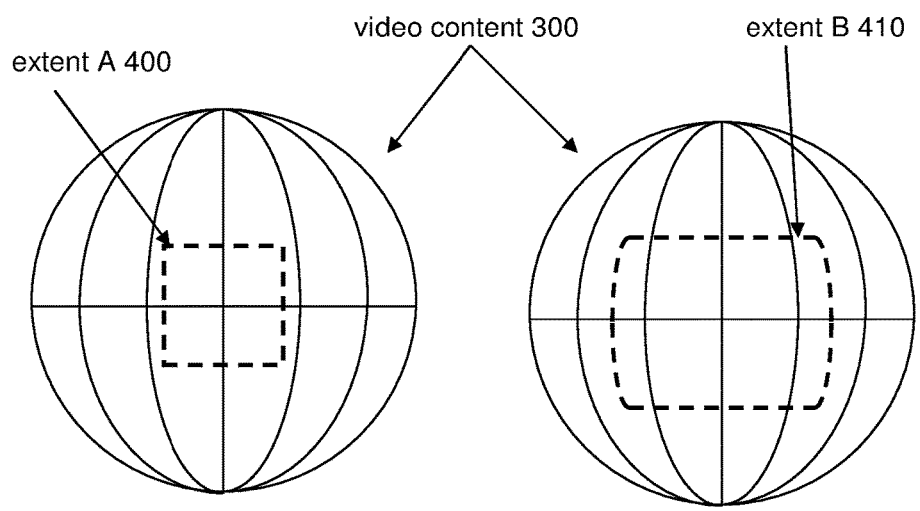
FIGS. 4A-4B illustrate example extents of spherical video content.

A viewing size may define a size (e.g., zoom) of viewable extents of visual content within the video content. For example, FIGS. 4A-4B illustrate examples of extents for the video content 300. In FIG. 4A, the size of the viewable extent of the video content 300 may correspond to the size of extent A 400. In FIG. 4B, the size of viewable extent of the video content 300 may correspond to the size of extent B 410. Viewable extent of the video content 300 in FIG. 4A may be smaller than viewable extent of the video content 300 in FIG. 4B. In some implementations, a viewing size may define different shapes of extents. For example, a viewing window may be shaped as a rectangle, a triangle, a circle, and/or other shapes. In some implementations, a viewing size may change based on a rotation of viewing. For example, a viewing size shaped as a rectangle may change the orientation of the rectangle based on whether a view of the video content includes a landscape view or a portrait view. Other rotations of a viewing window are contemplated.

The path information may define a path selection based on changes in the viewing direction of the viewing window and/or other information. In some implementations, the path information may further define the viewing size of the viewing window. For example, in addition to defining movement of a viewing window within the video content (based on change in the viewing direction), the path information may define the size (e.g., zoom, shape, rotation) of the viewing window as the viewing window moves within the video content. In some implementations, the path information may further define visual effects (e.g., color/brightness/contrast changes, warping, blurring, projection changes) for the video content.

Figure 5:
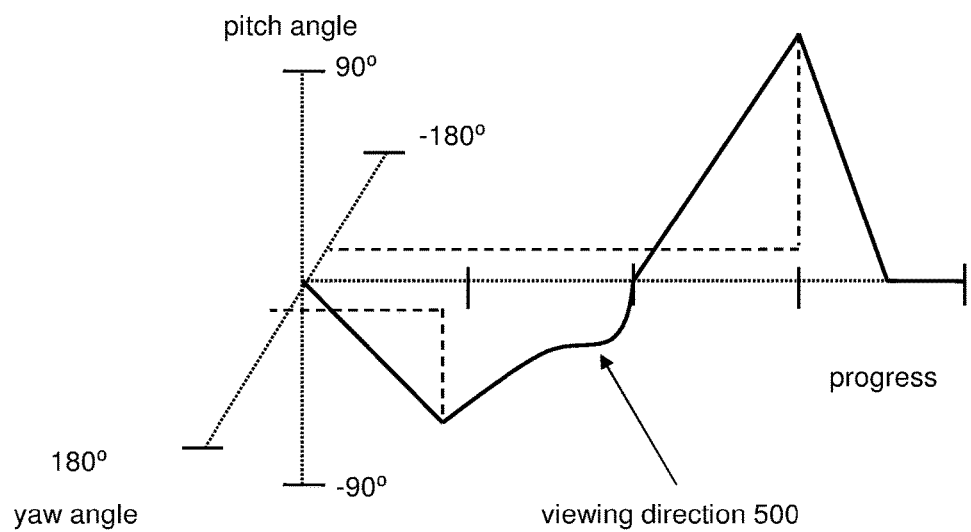
FIG. 5 illustrates example viewing directions for spherical video content.

A path selection may define changes in a viewing direction of a viewing window. That is, the movement of the viewing window within the video content may correspond to changes in the viewing direction of the viewing window. For example, FIG. 5 illustrates example changes in a viewing direction 500 for video content as a function of progress through the video content. The viewing direction 500 may change as a function of progress through the video content. For example, at 0% progress mark, the viewing direction 500 may correspond to a zero-degree yaw angle and a zero-degree pitch angle. At 25% progress mark, the viewing direction 500 may correspond to a positive yaw angle and a negative pitch angle. At 50% progress mark, the viewing direction 500 may correspond to a zero-degree yaw angle and a zero-degree pitch angle. At 75% progress mark, the viewing direction 500 may correspond to a negative yaw angle and a positive pitch angle. At 87.5% progress mark, the viewing direction 500 may correspond to a zero-degree yaw angle and a zero-degree pitch angle. Path selections including other changes in viewing directions are contemplated.

A path selection may define spatial aspects of time lapse videos. A path selection may determine which spatial extents of video content are included within time lapse videos. For example, based on a particular path selection for spherical video content, the visual content within the particular path may be extracted for use within a time lapse video (generating a punch-out of the video content using the path selection, moving a "virtual" camera through the video content based on the path selection).

In some implementations, a path selection may be determined based on one or more user-defined paths through the video content and/or other information. A user-defined path may refer to user-defined changes in a viewing direction of a viewing window. A user may define one or more user-defined paths by interacting with one or more software (e.g., mobile/desktop applications) and/or hardware (mobile/desktop devices). For example, a user-defined path may be created based on user engagement with a touchscreen display (e.g., the display 14) and/or one or more virtual/physical buttons/mouse/keyboards, movement/rotation of a device (e.g., signals generated by an inertial measurement unit characterizing movement/rotation of a smartphone, tablet, a head-mounted display), and/or other information.

Figure 6A:
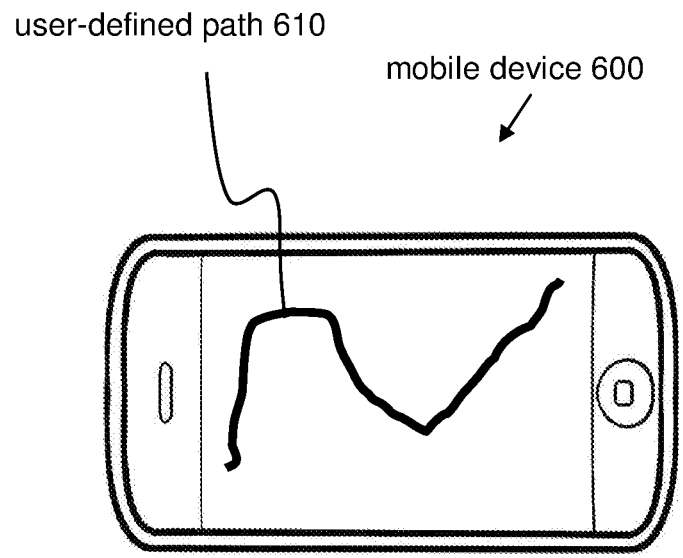
FIGS. 6A-6C illustrate example user-defined paths.

For example, FIG. 6A illustrates an example user-defined path 610 drawn on a touchscreen display of a mobile device 600 by a user. The user defined path 610 may correspond to user gestures on the touchscreen display. That is, a user may dictate the user-defined path for the video content by interacting (e.g., tracing a path, directing the viewing angle/punch-out) with the touchscreen display. Points on the user-defined path 610 may correspond to different points (e.g., different viewing directions) within the video content. In some implementations, a display may present the video content/representation of the video content in one or more projections (e.g., equirectangular projection, stereographic projection) and a user may create a user-defined path on top of the projected video content/representation.

Figure 6B:
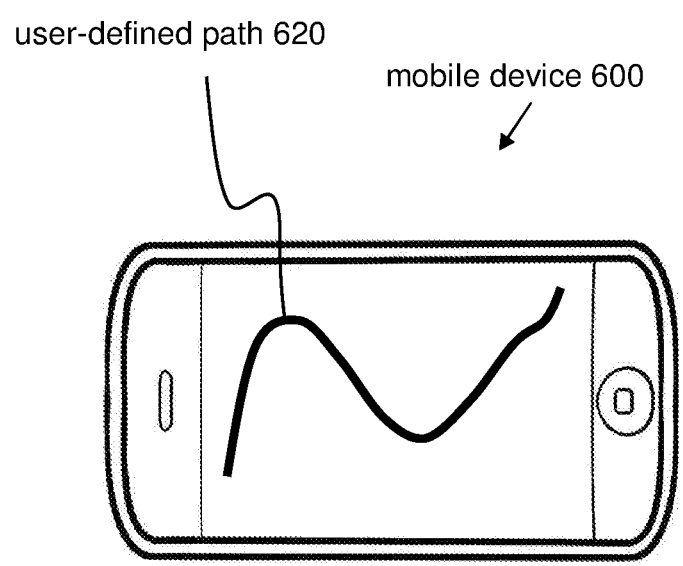

In some implementations, one or more stabilization filters may be applied to a user-defined path. For example, FIG. 6B illustrates a user-defined path 620 generated by applying a stabilization filter on the user-defined path 610. Applying stabilization filter(s) may smooth a path defined by a user. Such smoothing may simulate the use of a stabilization tool (mechanical/digital gimbal) on movement of a virtual camera through the video content. Such smoothing may create a smoother (e.g., without/reduced jitter) punch-out of the video content.

Figure 6C:
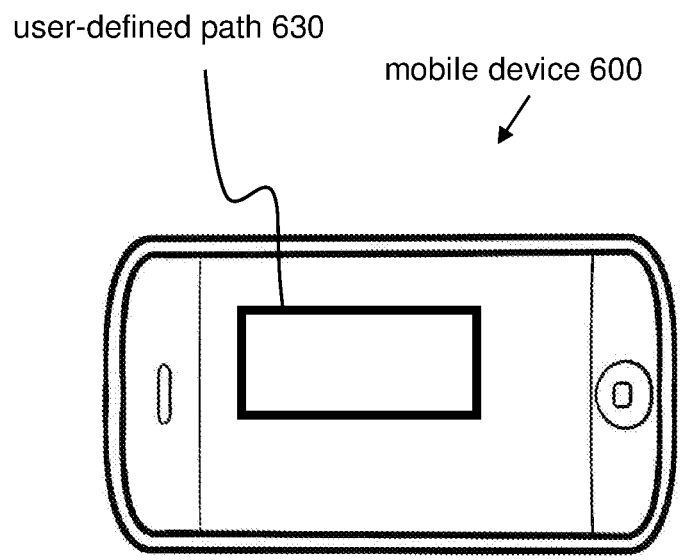

In some implementations, a path selection may be determined based on a user selection of one or more preset path shapes and/or other information. For example, a user may be presented with one or more preset path shapes (e.g., linear, non-linear) to use as a user-defined path. FIG. 6C illustrates a user-defined path 630 generated based on a user's selection of a rectangular preset path shape. The user may change the preset path shape (e.g., size, rotation, aspect-ratio). The user may determine the placement of the preset path shape within the video content. In some implementations, a combination of preset path shapes may be used for the path selection. For example, two or more (same and/or different) preset path shapes may be combined together. In some implementations, one or more stabilization filters may be applied to a user-defined path generated using preset path shapes (e.g., smoothing out sharp corners, smoothing out regions of join between shapes).

Figure 6D:
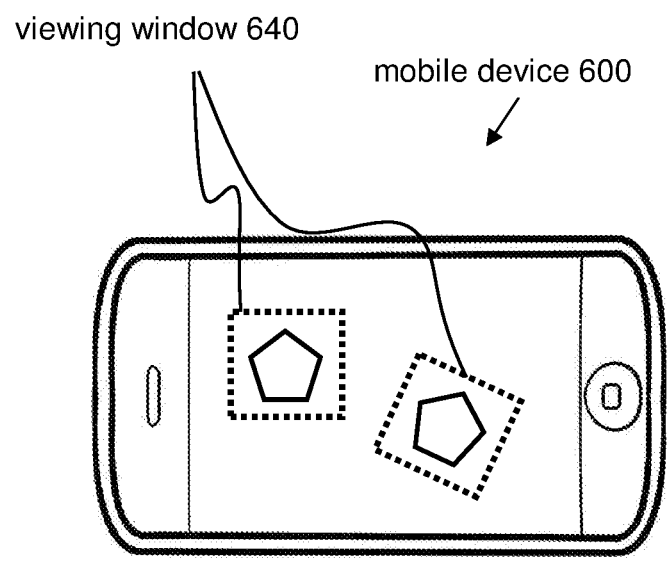
FIG. 6D illustrates example viewing window positions.

In some implementations, a path selection may be determined based on detecting one or more objects (e.g., living/non-living objects) within the video content and/or other information. The object(s) may be manually identified by a user (e.g., object/object boundary tagged by a user) or may be automatically identified based on one or more features (e.g., shape, outline, colors, movement, object identification (e.g., vehicle, person, animal, face, facial gestures, emotions)) using computer vision. In some implementations, a path selection may be determined such that the detected object(s) stay within the viewing window. For example, the detected object(s) may be centered within the viewing window, such as shown in FIG. 6D. For the object shown within FIG. 6D, the path selection may be determined so that a viewing window 640 moves (e.g., changes position/rotation within the video content) within the video content such that the object stays centered within the viewing window 640 (stays at the center of the viewing window 640, stays within a center region of the viewing window 640). Such a path selection may provide for object tracking within the video content. In some implementations, the path selection may include one or more dynamic zooms to change the framing (e.g., optimize framing) for one or more detected objects.

In some implementations, object tracking may be used to create a strobing effect within the time lapse video. For example, visuals of detected object(s) in different positions within the video content may be persistent through video frames of the time lapse video such that the detected object(s) appears to be at multiple locations at once. In some implementations, object tracking may be used to create a removing effect within the time lapse video. For example, visuals of detected object(s) in different positions within the video content may be tracked such that the viewing window used to generate the time lapse video are chosen/positioned to not include the detected object(s). Such an effect may enable creation of time-lapse videos that do not include certain objects within the environment (e.g., create a time-lapse video of a scene that do not include people moving in and out of the scene).

Figure 6E:
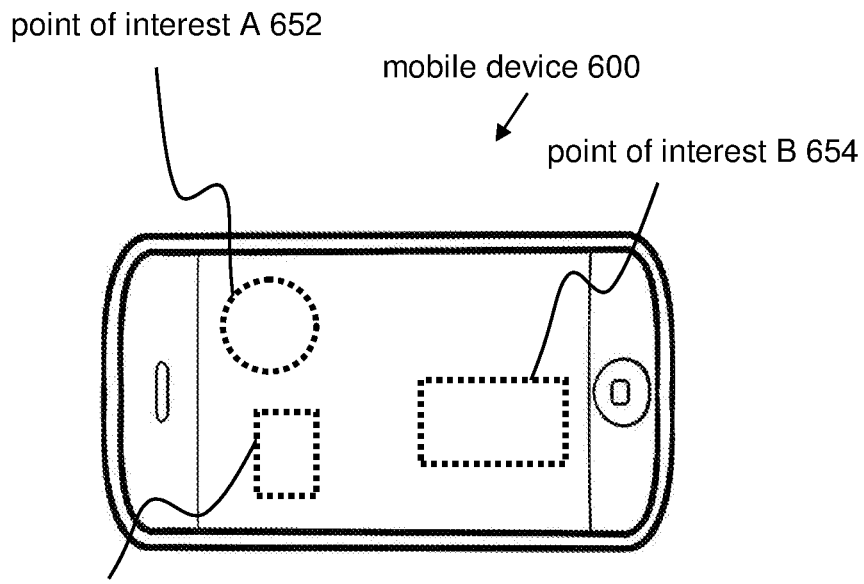
FIG. 6E illustrates example points of interest positions.

In some implementations, the path selection(s) may be determined based on moving between points of interest captured within the video content and/or other information. For example, points of interest captured within the video content may be identified (e.g., manually by a user, automatically based on computer vision). The path selection may be determined such that the viewing window moves between different points of interest. For example, referring to FIG. 6E, three different points of interest 652, 654, 656 may be identified within the video content. The path selection for the video content may be determined such that the points of interest 626, 654, 646 (or at least a portion of the points of interest 626, 654, 646) are within the viewing window for the video content at some point within the progress of the video content. For example, the viewing window may move within the video content such that the viewing window is initially positioned to include the point of interest A 652. The viewing window may then move to include the point of interest B 654. The viewing window may then move to include the point of interest C 656.

The order in which different points of interest may appear within the viewing window may be determined based on user input (e.g., user selecting the order of appearance of the points of interest 626, 654, 646), based on system defaults, based on random assignment of order, based on shortest path that can be taken by the viewing window to include all points of interest, based on one or more shapes of path, and/or other information. In some implementations, the viewing size of the viewing window may change based on the size of the points of interest. For example, the viewing size of the viewing window when looking at the point of interest B 654 may be larger than the viewing size of the viewing window when looking at the point of interest C 656. In some implementations, the viewing window may linger at a point of interest before moving onto the next point of interest. In some implementations, the duration of movement between points of interest (when the viewing window is moving between points of interest) may be determined based on user input, system defaults, and/or other information.

In some implementations, the path selection(s) may include automatic storytelling based on identification of multiple objects/points of interest. Multiple objects/points of interest may be tracked within the video content and the viewing window may dynamically switch between the different objects/points of interest (e.g., when they are not within the same scene/part of the same scene) to provide particular storytelling experience. The switching between objects/points of interest may be performed randomly, dynamically based on time intervals for video edits, intelligently based on identification of what is happening with/in/around the objects/points of interest and a determination of interest metric indicating the level of likely interests in the scenes/objects/points of interest for one or more users (e.g., dynamically switching based on interest metric to keep most interesting scenes/objects/points of interest within the viewing window), and/or other information.

Figure 6F:
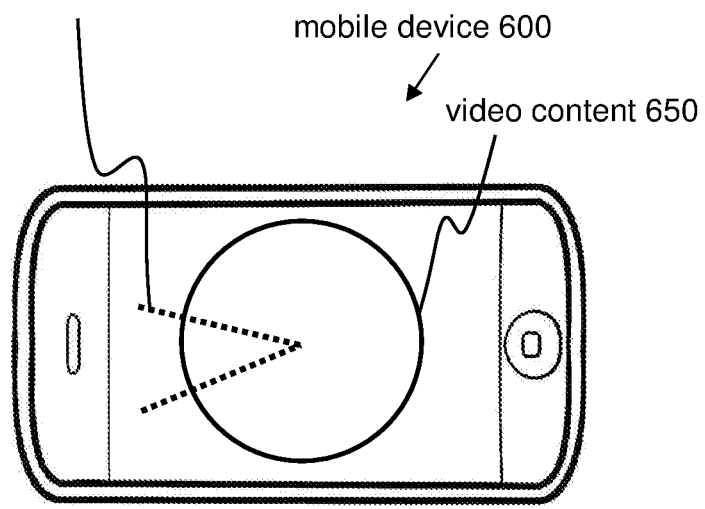
FIG. 6F illustrates example rotations of video content.

In some implementations, the path selection(s) may be determined based on one or more rotations of the video content about one or more axes and/or other information. Rotations of the video content about one or more axes may include rotation of the video content and/or rotation of the viewing window for the video content. For example, referring to FIG. 6F, a viewing window for video content 650 may have a viewing window field of view 662, which defines the extent of the video content 650 within the viewing window. A path selection may be determined based on rotation of the viewing window field of view 662 and/or based on rotation of the video content 650. For example, the viewing window field of view 662 and/or the video content 650 may be rotated clockwise or counter-clockwise to place different extents of the video content 650 within the viewing window field of view 662. In some implementations, the rotation of the video content may be limited to rotation about a particular axis (e.g., limited to horizontal movement of the viewing window). In some implementations, the rotation of the video content may include rotation about multiple axes. In some implementations, the direction of rotation of the video content may change (e.g., the viewing window moving through the video content in a sine/triangular/rectangular waveform path). Other directions/types of rotations are contemplated.

Such a path selection may effectuate a spinning effect for the time lapse video. Spinning effect may be controlled via one or more parameters, such as rate of rotation/revaluation, rate of images (interval of image sampling), duration of rotation/spinning effect. One or more parameters for spinning effect may be set based on user input, system defaults, content captured within video content (e.g., different spinning parameters based on different objects/events/activities detected within the video content), and/or other information.

The time lapse parameter component 106 may be configured to obtain time lapse parameter information and/or other information. The time lapse parameter information may define at least two of (1) a time portion of the duration of the video content to be included in the time lapse video (time portion parameter), (2) an image sampling rate defining video frame selection for the time lapse video (sampling parameter), (3) a time lapse speed effect defining a perceived speed with which the time lapse video is presented during playback (speed effect parameter), and/or other information.

The time portion of the duration of the video content to be included in the time lapse video may include the entire duration of the video content or one or more portions of the duration of the video content. For example, for a video content including a duration of twenty-four hours, the time portion of the duration to be included in the time lapse video may include the entire twenty-four hour period, a portion of a shorter duration (e.g., one hour), or multiple portions of shorter durations (e.g., multiple one-hour portions, multiple portions of different durations).

The image sampling rate may define the rate at which visuals of the video content are selected for inclusion as video frames in the time lapse video. For example, an image sampling rate of one image per minute may result in the time lapse video including video frames of the video content that were captured one-minute apart. In some implementations, the image sampling rate may not be aligned to the video frames within the video content. For example, a particular image sampling rate may result in sampling at a moment between two captured video frames. In such a situation, image sampling may use the video frame captured closest to the sampling moment and/or may use interpolation of nearby video frames for sampling.

The time lapse speed effect may control the perceive speed with which the time lapse video is presented. For example, a 2× time lapse speed effect may result in a time lapse video that appears to play back the video content at twice the speed, a 0.5× time lapse speed effect may result in a time lapse video that appears to play back the video content at half the speed, and a 1× time lapse speed effect may result in a time lapse video that appears to play back the video content at regular speed. In some implementations, the time lapse speed effect may be determined based on a duration of the time lapse video. That is the duration of the time lapse video may be compared with the duration of the video content to be included in the time lapse video to determine the time lapse speed effect (e.g., a time lapse video having a duration of one minute for an hour of video content may result in a 60× time lapse speed effect).

In some implementations, the time lapse parameter component 106 may be configured to determine one of the time lapse parameters based on reception of two time lapse parameters. For example, the time lapse parameter component 106 may determine the time portion parameter based on reception of the sampling parameter and the speed effect parameter. The time lapse parameter component 106 may determine the sampling parameter based on reception of the time portion parameter and the speed effect parameter. The time lapse parameter component 106 may determine the speed effect parameter based on reception of the time portion parameter and the sampling parameter.

The time lapse video component 108 may be configured to generate time lapse video information and/or other information. The time lapse video information may define a time lapse video based on the video information, the path information, the time lapse parameter information, and/or other information. The time lapse video may including at least a portion of the visual content of the video content within the viewing window during the time portion of the duration. That is, the extent of the visual content of the video content included in the time lapse parameter may include the visual content within the viewing window and/or other information. The viewing window may move within the video content based on the path information and/or other information. The video frames extracted from the video content for inclusion in the time lapse video may be determined based on the time lapse parameter information and/or other information.

In some implementations, the time lapse video may include at least a portion of the audio of the video content. The audio of the video content included in the time lapse video may include audio corresponding to one or more of the video frames extracted from the video content. The audio of the video content included in the time lapse video may correspond to one or more portions of the video content at which one or more events occur (e.g., audio at one or more particular time portions (e.g., midway) within the video content, audio including a particular sound pattern and/or intensity). For example, for a fifteen-second time lapse video generated from an hour-long video content, the time lapse video may include fifteen seconds or less of audio from the video content. As another example, for a fifteen-second time lapse video generated from an hour-long video content, the time lapse video may include more than fifteen seconds audio from the video content, which the extracted audio (or a portion of the extracted audio) played back at higher speed.

In some implementations, the time lapse video may include audio from another audio track (e.g., music selected by a user to be played as an accompaniment for the time lapse video, words spoken by the user and recorded by a sound sensor). The volume of the audio in the time lapse video (e.g., audio from the video content and/or audio from another audio track) may be adjusted by the user.

In some implementations, the time lapse video information may include one or more files containing descriptions/instructions regarding how to present the time lapse video during playback. For example, the time lapse video information may be generated as a director track that includes information as to what portion (e.g., spatial extent, temporal portion) of the video content is to be display. Generating a director track may enable the creation of the time lapse video without encoding and storing separate video content. The director track may be used to generate the time lapse video on the fly. For example, video content may be stored on a server and different director tracks defining different time lapse videos may be stored on individual mobile devices and/or at the server. A user wishing to view a particular time lapse video may provide the corresponding director track to the server and/or select the corresponding director track stored at the server. The time lapse video may be presented based on the director track. In some implementations, video content may be stored on a client device (e.g., mobile device). A user may access different director tracks to view different time lapse videos of the video content without encoding and storing separate time lapse videos. Other uses of director tracks are contemplated.

In some implementations, the time lapse video information may define encoded time lapse video. For example, generating a time lapse video for spherical video content may include encoding one or more non-spherical time lapse video (e.g., viewing window covering a portion of the spherical capture) based on the path information. The encoded time lapse video may include smaller visual extents of the video content and/or may include smaller time portions of the video content. Such a punch-out of the video content may be smaller in size than the video content, and may enable more efficient sharing of the desired portions of the video content than sharing the entire video content (e.g., a user may share a smaller time lapse video rather than sharing the entire video content).

The storage component 110 may be configured to effectuate storage of the time lapse video information and/or other information in one or more storage media. In some implementations, the storage component 110 may effectuate storage of the time lapse video information in one or more storage locations including the video information and/or other storage locations. For example, the video information may have been obtained from the electronic storage 12 and the time lapse video information may be stored in the electronic storage 12. In some implementations, the storage component 110 may effectuate storage of the time lapse video information in one or more remote storage locations (e.g., storage media located at/accessible through a server). In some implementations, the storage component 110 may effectuate storage of the time lapse video information through one or more intermediary devices. For example, the processor 11 may be located within an image capture device without a connection to the storage device (e.g., the image capture device lacks WiFi/cellular connection to the storage device). The storage component 110 may effectuate storage of the time lapse video information through another device that has the necessary connection (e.g., the image capture device using a WiFi/cellular connection of a paired mobile device, such as a smartphone, tablet, laptop, to store the time lapse video information in one or more storage media). Other storage locations for and storage of the time lapse video information are contemplated.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 12, and the display 14 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
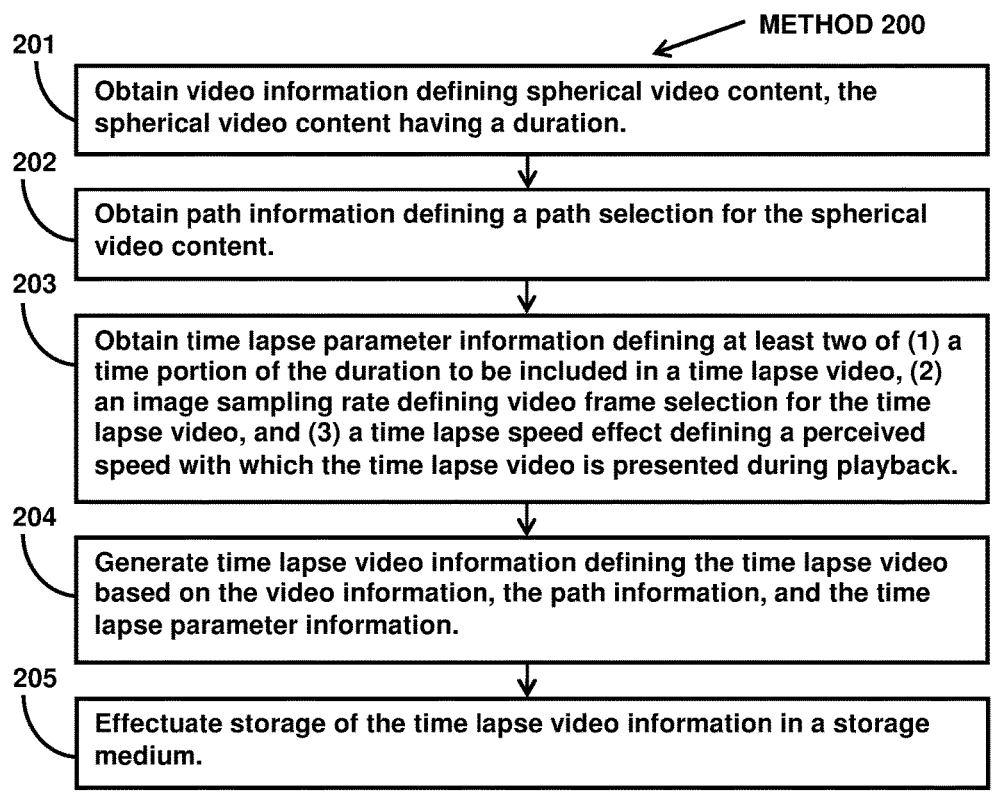
FIG. 2 illustrates a method for generating time lapse videos.

FIG. 2 illustrates method 200 for generating time lapse videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining spherical video content may be obtained. The spherical video content may have a duration. The spherical video content may define visual content viewable from a point of view as a function of progress through the spherical video content. In some implementation, operation 201 may be performed by a processor component the same as or similar to the video information component 102 (Shown in FIG. 1 and described herein).

At operation 202, path information defining a path selection for the spherical video content may be obtained. The path selection may include movement of a viewing window within the spherical video content. The viewing window may define extents of the visual content viewable from the point of view as the function of progress through the spherical video content. In some implementations, operation 202 may be performed by a processor component the same as or similar to the path information component 104 (Shown in FIG. 1 and described herein).

At operation 203, time lapse parameter information may be obtained. The time lapse parameter information may define at least two of (1) a time portion of the duration to be included in a time lapse video, (2) an image sampling rate defining video frame selection for the time lapse video, and (3) a time lapse speed effect defining a perceived speed with which the time lapse video is presented during playback. In some implementations, operation 203 may be performed by a processor component the same as or similar to the time lapse parameter component 106 (Shown in FIG. 1 and described herein).

At operation 204, time lapse video information defining the time lapse video may be generated. The time lapse video information may be generated based on the video information, the path information, and the time lapse parameter information. The time lapse video may include at least a portion of the visual content of the spherical video content within the viewing window during the time portion of the duration. In some implementations, operation 204 may be performed by a processor component the same as or similar to the time lapse video component 108 (Shown in FIG. 1 and described herein).

At operation 205, storage of the time lapse video information in a storage medium may be effectuated. In some implementations, operation 205 may be performed by a processor component the same as or similar to the storage component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that generates a time lapse video, the system comprising:
one or more physical processors configured by machine-readable instructions to:
obtain video information defining spherical video content, the spherical video content having a duration, the spherical video content defining visual content viewable from a point of view as a function of progress through the spherical video content;
determine a path selection for the spherical video content based on a user-defined path through the spherical video content, the path selection defining movement of a viewing window within the spherical video content, the viewing window defining extents of the visual content viewable from the point of view as the function of progress through the spherical video content, wherein the user-defined path is created based on user engagement with a touchscreen display, the user engagement with the touchscreen display including selection of points of interest corresponding to different viewing directions within the spherical video content as the function of progress through the spherical video content such that the selection of points of interest includes selection of a first point of interest corresponding to a first viewing direction at a first moment within the spherical video content and selection a second point of interest corresponding to a second viewing direction at a second moment within the spherical video content;
obtain time lapse parameter information defining at least two of (1) a time portion of the duration to be included in the time lapse video, (2) an image sampling rate defining video frame selection for the time lapse video, and (3) a time lapse speed effect defining a perceived speed with which the time lapse video is presented during playback;

generate time lapse video information defining the time lapse video based on the video information, the path selection, and the time lapse parameter information, the time lapse video including at least a portion of the visual content of the spherical video content within the viewing window during the time portion of the duration such that the time lapse video includes a first portion of the visual content within the viewing window pointed in the first viewing direction at the first moment and a second portion of the visual content within the viewing window pointed in the second viewing direction at the second moment; and effectuate storage of the time lapse video information in a storage medium.

2. The system of claim 1, wherein the user engagement with the touchscreen display includes a user tracing a path along the touchscreen display, the path traced by the user corresponding to the different viewing directions within the spherical video content as the function of progress through the spherical video content, the path traced by the user including the first point of interest at the first moment within the spherical video content and the second point of interest at the second moment within the spherical video content.

3. The system of claim 2, wherein the path traced by the user is smoothed to simulate use of a stabilization tool on movement of a virtual camera through the spherical video content.

4. The system of claim 1, wherein the user engagement with the touchscreen display includes a user selecting one or more preset path shapes to use as the user-defined path, the one or more preset path shapes placed within the spherical video content and including the first point of interest at the first moment within the spherical video content and the second point of interest at the second moment within the spherical video content.

5. The system of claim 1, wherein the user engagement with the touchscreen display includes a user selecting an object within the spherical video content, the user-defined path created to follow the selected object such that the viewing window moves with the object, the object located at the first point of interest at the first moment within the spherical video content and at the second point of interest at the second moment within the spherical video content.

6. The system of claim 5, wherein the object is centered within the viewing window.

7. The system of claim 5, wherein a viewing size of the viewing window is determined based on the object.

8. The system of claim 1, wherein the path selection is determined based on moving between points of interest selected within the spherical video content such that the viewing window moves from the first viewing direction at the first moment within the spherical video content to the second viewing direction at the second moment within the spherical video content.

9. The system of claim 1, wherein the user engagement with the touchscreen display includes a user selecting a clockwise or a counter-clockwise rotation of the spherical video content about an axis, the rotation of the spherical video content about the axis placing within the viewing window the first point of interest at the first moment within the spherical video content and the second point of interest at the second moment within the spherical video content.

10. The system of claim 1, wherein the time lapse speed effect includes a 1× time lapse speed effect.

11. A method for generating a time lapse video, the method performed by a computing system including one or more physical processors, the method comprising:

obtaining, by the computing system, video information defining spherical video content, the spherical video content having a duration, the spherical video content defining visual content viewable from a point of view as a function of progress through the spherical video content;

determining, by the computing system, a path selection for the spherical video content based on a user-defined path through the spherical video content, the path selection defining movement of a viewing window within the spherical video content, the viewing window defining extents of the visual content viewable from the point of view as the function of progress through the spherical video content, wherein the user-defined path is created based on user engagement with a touchscreen display, the user engagement with the touchscreen display including selection of points of interest corresponding to different viewing directions within the spherical video content as the function of progress through the spherical video content such that the selection of points of interest includes selection of a first point of interest corresponding to a first viewing direction at a first moment within the spherical video content and selection a second point of interest corresponding to a second viewing direction at a second moment within the spherical video content;

obtaining, by the computing system, time lapse parameter information defining at least two of (1) a time portion of the duration to be included in the time lapse video, (2) an image sampling rate defining video frame selection for the time lapse video, and (3) a time lapse speed effect defining a perceived speed with which the time lapse video is presented during playback;

generating, by the computing system, time lapse video information defining the time lapse video based on the video information, the path selection, and the time lapse parameter information, the time lapse video including at least a portion of the visual content of the spherical video content within the viewing window during the time portion of the duration such that the time lapse video includes a first portion of the visual content within the viewing window pointed in the first viewing direction at the first moment and a second portion of the visual content within the viewing window pointed in the second viewing direction at the second moment; and effectuating, by the computing system, storage of the time lapse video information in a storage medium.

12. The method of claim 11, wherein the user engagement with the touchscreen display includes a user tracing a path along the touchscreen display, the path traced by the user corresponding to the different viewing directions within the spherical video content as the function of progress through the spherical video content, the path traced by the user including the first point of interest at the first moment within the spherical video content and the second point of interest at the second moment within the spherical video content.

13. The method of claim 12, wherein the path traced by the user is smoothed to simulate use of a stabilization tool on movement of a virtual camera through the spherical video content.

14. The method of claim 11, wherein the user engagement with the touchscreen display includes a user selecting one or more preset path shapes to use as the user-defined path, the one or more preset path shapes placed within the spherical video content and including the first point of interest at the first moment within the spherical video content and the second point of interest at the second moment within the spherical video content.

15. The method of claim 11, wherein the user engagement with the touchscreen display includes a user selecting an object within the spherical video content, the user-defined path created to follow the selected object such that the viewing window moves with the object, the object located at the first point of interest at the first moment within the spherical video content and at the second point of interest at the second moment within the spherical video content.

16. The method of claim 15, wherein the object is centered within the viewing window.

17. The method of claim 15, wherein a viewing size of the viewing window is determined based on the object.

18. The method of claim 11, wherein the path selection is determined based on moving between points of interest selected within the spherical video content such that the viewing window moves from the first viewing direction at the first moment within the spherical video content to the second viewing direction at the second moment within the spherical video content.

19. The method of claim 11, wherein the user engagement with the touchscreen display includes a user selecting a clockwise or a counter-clockwise rotation of the spherical video content about an axis, the rotation of the spherical video content about the axis placing within the viewing window the first point of interest at the first moment within the spherical video content and the second point of interest at the second moment within the spherical video content.

20. The method of claim 11, wherein the time lapse speed effect includes a 1× time lapse speed effect.

\* \* \* \* \*